United States Patent [19]

Hanagata

[11] 4,356,386

[45] Oct. 26, 1982

[54] DESK-TOP CALCULATOR

[75] Inventor: Takayoshi Hanagata, Yamato, Japan

[73] Assignee: Canon Kabushiki Kaisha, Tokyo, Japan

[21] Appl. No.: 107,940

[22] Filed: Dec. 28, 1979

[30] Foreign Application Priority Data

Jan. 30, 1979 [JP] Japan .................................... 54-9369

[51] Int. Cl.³ .............................................. G06C 11/04
[52] U.S. Cl. ............................. 235/61 PK; 235/58 P; 235/1 C
[58] Field of Search ................ 235/1 C, 1 D, 61 PK, 235/58 CW, 58 CK, 58 M, 58 P, 60 P, 432; 101/101, 106, 108, 110; 400/470, 29, 123, 173; 364/706-709

[56] References Cited

U.S. PATENT DOCUMENTS

| 3,561,673 | 2/1971 | Kerestes | 235/58 P |
| 4,027,766 | 6/1977 | Sargentini et al. | 101/108 X |
| 4,038,535 | 7/1977 | Aldridge et al. | 364/708 X |

Primary Examiner—Benjamin R. Fuller
Attorney, Agent, or Firm—Fitzpatrick, Cella, Harper & Scinto

[57] ABSTRACT

A desk-top calculator wherein a printer of the type having a movable character wheel is designed so as to effect printing on paper on a desk and when the calculator is moved, the character wheel is returned to its initial position.

2 Claims, 5 Drawing Figures

DESK-TOP CALCULATOR

BACKGROUND OF THE INVENTION

1. Field of the Invention

This invention relates to a desk-top calculator.

2. Description of the Prior Art

As the output means of desk-top electronic calculators, there have been means of the display type using LED or a fluorescent display tube, means of the printing type containing a printer therein, or means of the type containing both of them therein. The output means of the recording type has a merit of minimizing erroneous calculations or erroneous transcription by leaving records, while it has suffered from numerous disadvantages, namely, that (1) the calculating speed is slow, (2) a complicated mechanism contained therein leads to bulkiness and expensiveness of the machine, (3) the records are rarely preserved for a long time and are usually transcribed onto an account book or a notebook, (4) calculation cannot be carried out when the recording paper is exhausted, (5) even in a case where only answers need be recorded, the calculation becomes slower due to the printing, (6) much recording paper must be used, and (7) numerals entered cannot be confirmed until they are printed. In a calculator having both display means and recording means, the disadvantages (1), (4), (5), (6) and (7) can be eliminated, but the disadvantages (2) and (3) will be left to be solved.

To improve these points, a device has been devised which has character wheels having the same number of columns as the display in a portion of a display type calculator and which has means for selecting the same characters as the display on the character wheels when printing is desired. If ink is applied to the character group and this character group is urged against the surface of paper on which it is desired to effect recording, the record will be left and no erroneous transciption will occur.

However, this device has suffered from disadvantages that (8) the great number of character wheels leads to mechanical complication and accordingly to bulkiness, heaviness and expensiveness of the device, (9) operation is cumbersome and not practical, and (10) immediately before the printing is effected, the portion to be printed is hidden from sight by the character wheels so that position adjustment is difficult.

SUMMARY OF THE INVENTION

In view of the above-noted points, the present invention intends to provide a device which can accurately print necessary numerals at any desired positions on paper or cloth on which it is desired to effect recording. Further, the present invention does not use a number of character wheels and can therefore provide a device which is very compact and light in weight as well as inexpensive.

The invention will become fully apparent from the following detailed description thereof taken in conjunction with the accompanying drawings.

DESCRIPTION OF THE PREFERRED EMBODIMENTS

Figure 1:
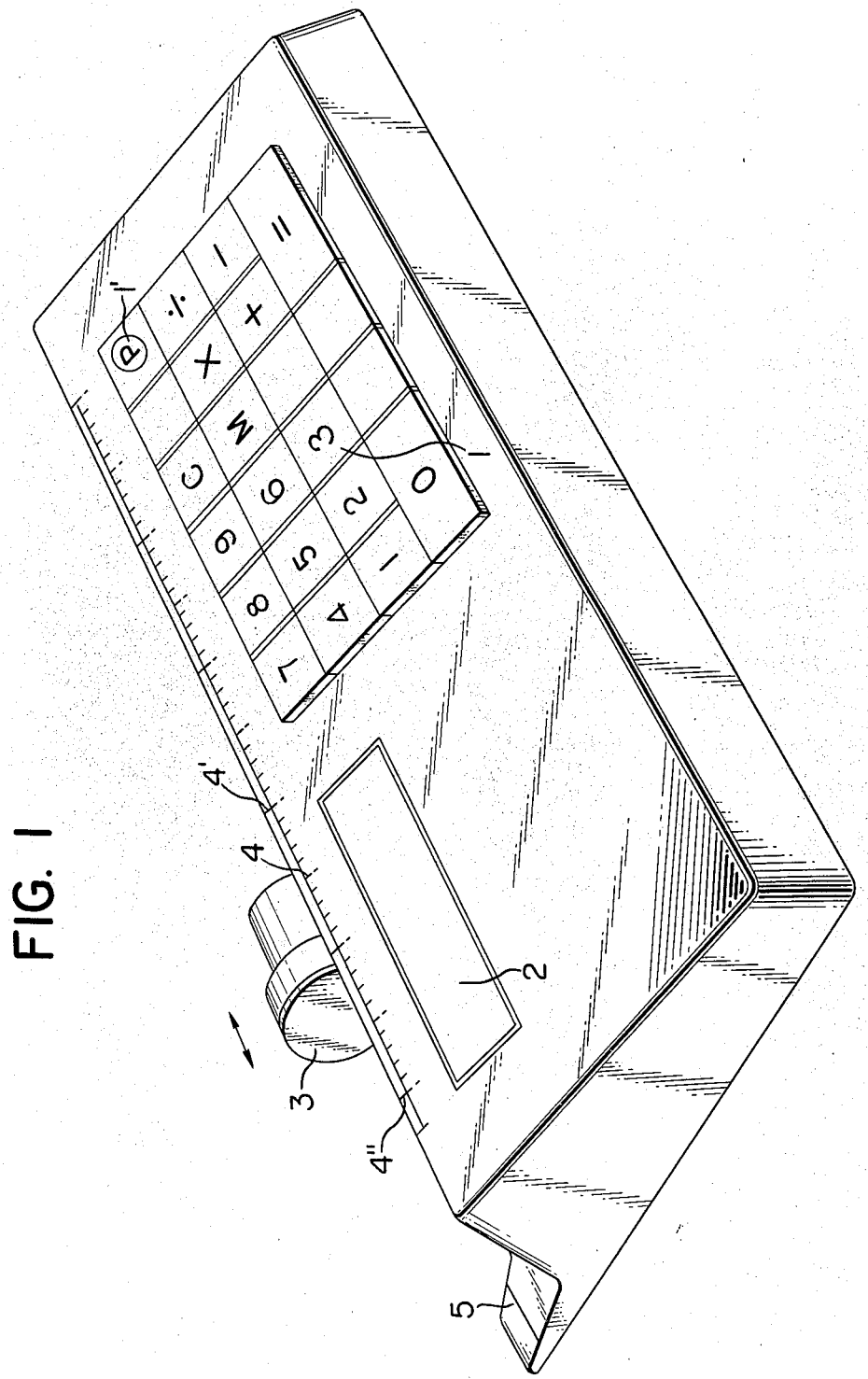
FIG. 1 is a pictorial view of an embodiment of the present invention.
Figure 2:
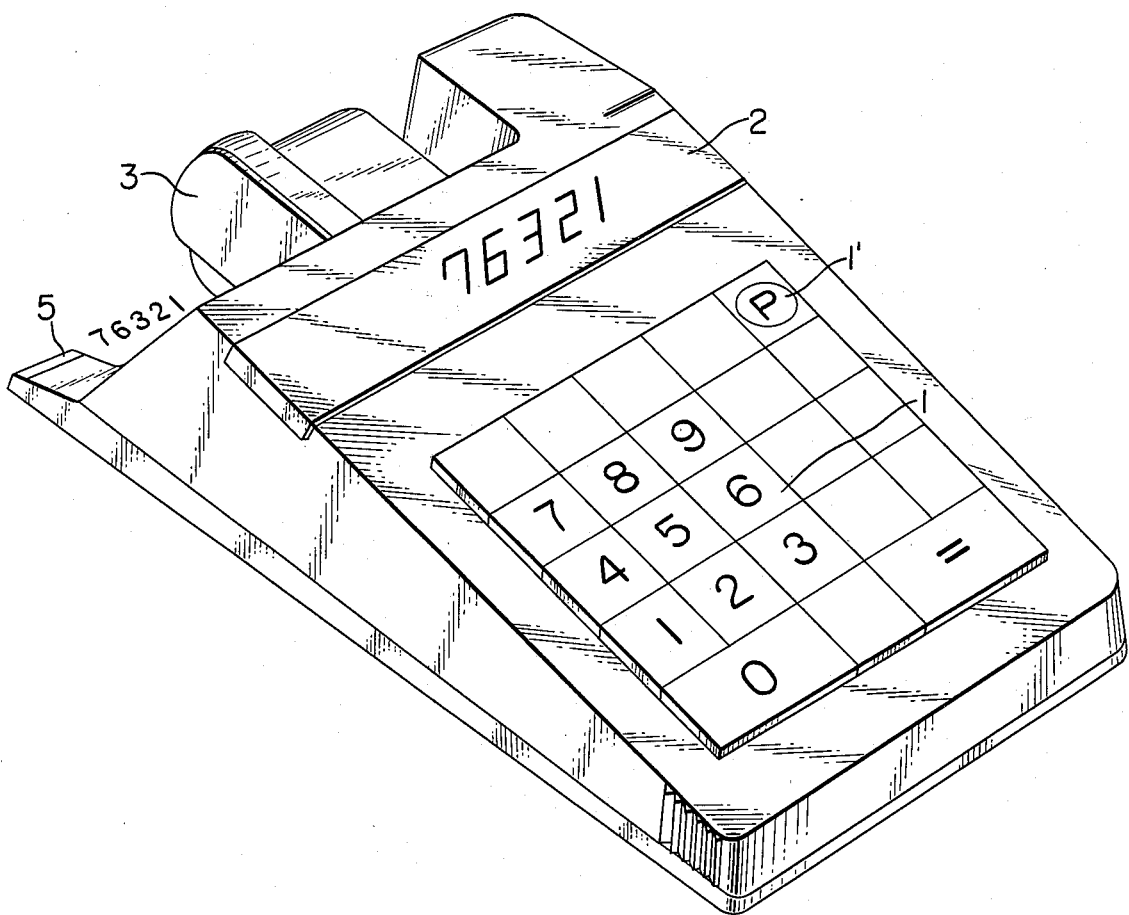
FIG. 2 is a pictorial view of another embodiment.

Referring to FIG. 1 which is a perspective view of the desk-top calculator according to the present invention, reference numeral 1 designates a key group having a ten-key and instruction keys such as four fundamental rules of arithmetics, reference numeral 2 designates a display device, and reference numeral 3 denotes a print head provided rearwardly of the calculator. When the calculator is placed on paper on which it is desired to effect recording and a key 1' is depressed, a numeral displayed on the display device 2 can be printed. The print head 3 is moved rightwardly by an amount corresponding to one column for printing of each column. The printing position is determined by the intersection between a scale 4 for determining the position of the print head 3 in the left and right directions and a longitudinal position adjusting mark 5. As will readily be presumed from FIG. 1, in the print terminated position, the print head 3 does not lie on a printed numeral and therefore, there is no inconvenience in viewing the numeral. To adjust the calculator to the next printing position, if the calculator is of a ten-digit type, the calculator may be moved so that the least significant digit comes to the intersection between the position of 4' on the scale 4 and the adjusting mark 5, and before the printing is started, the print head 3 does not lie on the least significant digit and therefore, position adjustment can be accomplished very easily. Returning the print head 3 to its initial position 4" can be accomplished by changing the posture of the calculator as will later be described in detail. FIG. 2 shows a modification of the present invention which is made more compact and lighter in weight than the calculator of FIG. 1.

Figure 3:
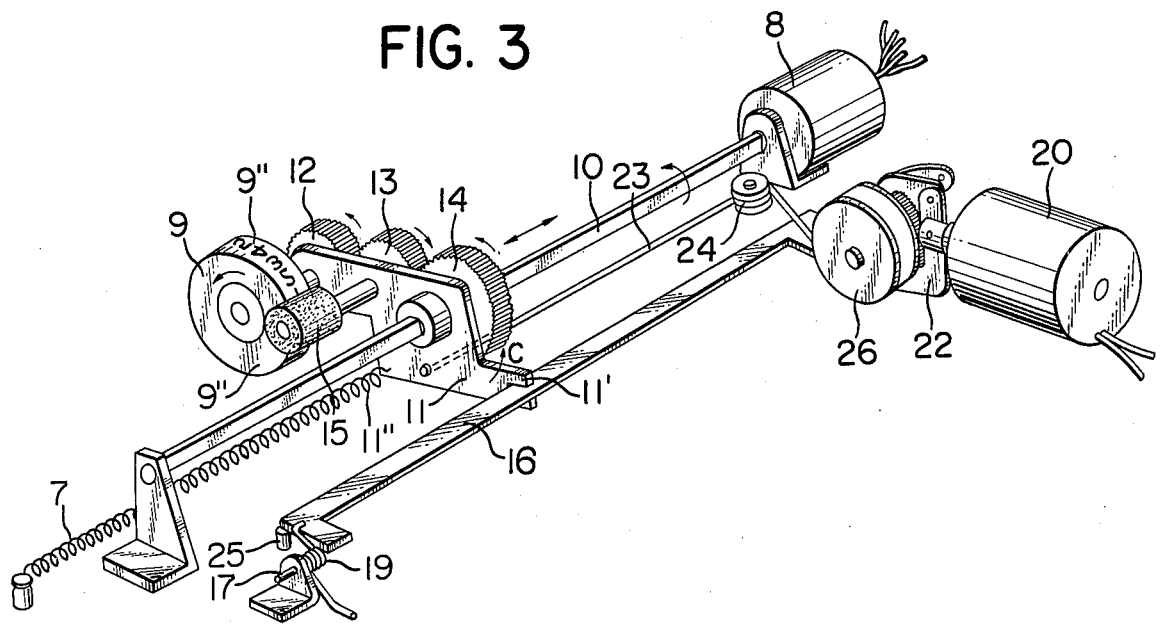
FIG. 3 shows an example of the printer portion.

FIG. 3 is a perspective view of a printer used with the calculator of FIG. 1. In FIG. 3, a pulse motor 8 is the means for selecting a character 9''', on a character wheel 9 to be printed. The shaft of the pulse motor 8 is directly connected to a shaft 10 of semicircular cross-section. Rotatably mounted on a carriage 11 are the character wheel 9, a gear 12 directly connected to the character wheel, an intermediate gear 13, a gear 14 slidably mounted on the shaft 10, and an ink roller 15 normally urged against the character wheel 9 with a weak force. The ink roller 15 may be easily replaced with another one by the user, if required. The rotation of the pulse motor 8 is transmitted to the gear 12 through the shaft 10, gear 14 and gear 13. The surface of the character 9'' to be printed is inked by controlling the rotation so that the character 9'' is at least once brought into contact with the ink roller 15 before the character 9'' is printed.

The carriage 11 is slidable on the shaft 10 as already described, and is also rotatable about the shaft 10. However, a lever 16 is engaged in a recess 11' formed in a portion of the carriage 11, thereby maintaining the posture of the carriage. The lever 16 is rotatable about a pivot 17 (a pivot 18 in FIG. 4) but is normally maintained at a position in which it bears against a stop 25, by a spring 19. In this position, the character 9'' of the character wheel 9 is higher than the bottom surface of the calculator. Accordingly, even if the calculator is placed on paper, the character wheel 9 does not contact the paper. A coil spring 7 is hooked to a portion 11'' of the carriage 11 to bias the carriage leftwardly as viewed in FIG. 3. When reset by a method to be described, the carriage is at the left end.

Figure 4:
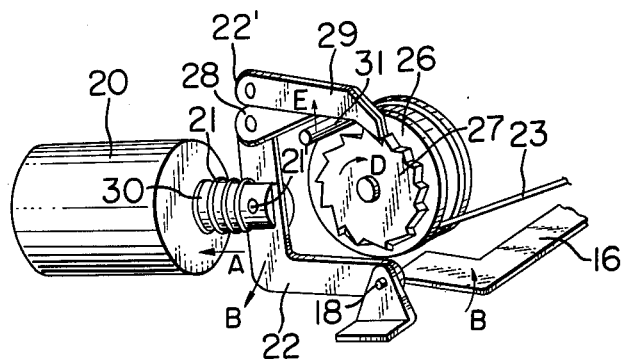
FIG. 4 is a detailed view of a portion thereof.

In printing, the character wheel 9 is first driven by the pulse motor 8 to bring a character 9" to be printed into opposed relationship with the paper on the desk. Next, a plunger 20 shown in FIG. 4 is energized. The iron core 21 of the plunger 20 is attracted in the direction of arrow A. One end 21' of the iron core 21 causes a lever 22 to be rotated in the direction of arrow B. Since the lever 22 is integral with the lever 16, the lever 16 is rotated in the direction of arrow B, whereupon the carriage 11 is rotated about the shaft 10 in the direction of arrow C (FIG. 3) to bring the character 9" into contact with the paper, whereby the character 9" is printed. A wire 23 is hooked to the carriage 11 in a direction opposite to the direction in which the coil spring 7 is hooked, and the wire 23 is wound on a drum 26 through a pinch roller 24, and a ratchet wheel 27 is mounted coaxially with the drum 26. A movable pawl 28 is mounted for rotation about one end 22' of the lever 22. When the iron core 21 is attracted and the lever 22 is rotated in the direction of arrow B, the movable pawl 28 is also moved but the ratchet wheel 27 is not rotated because it is engaged by a fixed pawl 29. When the attraction of the solenoid 20 is terminated, namely, when the printing is terminated, the iron core 21 is returned to its initial position by a spring 30 and at this time, the lever 22 is rotated in the direction opposite to arrow B and the ratchet wheel 27 is rotated by an amount corresponding to a pawl in the direction of arrow D, by the movable pawl 28. Since the force of the spring 30 is set to a value sufficiently greater than the force of the coil spring 7, the carriage 11 advances rightwardly by an amount corresponding to one column. By repeating such operation, printing is possible from the left to the right. When the carriage comes to the right end, no further printing is possible. Therefore, the carriage 11 must be returned to its initial position. In FIG. 4, if a dowel 31 is moved in the direction of arrow E, the movable pawl 28 and fixed pawl 29 are disengaged from the ratchet wheel 27 and the carriage 11 is returned to its initial position by the force of the coil spring 7. The drum 26 contains therewithin a weak spring which imparts such a degree of force that the wire 23 is not slackened when the carriage has returned to the left end. That is, the position to which the carriage has returned provides a first printing column and thus, the printer again assumes a position ready to print.

A plunger or the like will occur to mind as the means for moving the dowel 31 in the direction of arrow E, but a plunger is heavy in weight and consumes much electrical power.

Figure 5:
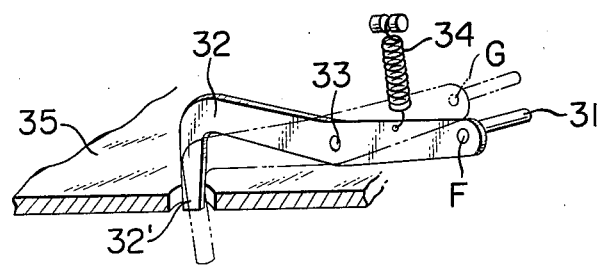
FIG. 5 is a detailed view of the other portion.

According to the present embodiment, there always takes place an operation of moving the calculator in order to effect printing on a new place after the printing of one line. Therefore, the calculator is set such that when the calcultor is lifted and moved, and carriage automatically returns to its initial position. FIG. 5 shows the means for realizing this. A lever 32 is rotatable about a pivot 33 and the force of a spring 34 causes one end 32' of the lever 32 to always jut out below the bottom surface 35 of the calculator. However, when the calculator rests on recording paper, the lever 32 assumes its position indicated by solid line in FIG. 5, due to the gravity of the calculator. That is, the dowel is at its position F. Next, when the calculator is lifted, the lever 32 is rotated to its position indicated by phantom line, by the force of the spring 34. Thus, the dowel 31 comes to assume its position G. Since this is the movement of the dowel 31 in the direction of arrow E indicated in FIG. 4, the carriage is returned to its initial position.

As described above, the present embodiment, unlike ordinary recording type calculators, is very light in weight and compact and inexpensive and moreover, the printing energy thereof can be reduced to minimum and therefore this embodiment is best suited to be driven by a battery. Further, in the present embodiment, characters printed with their printing positions readily predetermined can also be seen clearly without moving the calculator.

What I claim is:

1. A calculator having:
    a rotatable character wheel having a character surface on which a plurality of characters are provided, wherein ink is supplied to the character surface from an ink roller;
    means for causing said character wheel to move toward a printing position, and for transferring the ink on a selected character of said character wheel to an arbitrary printing paper on a desk or table by means of urging said character wheel to the printing paper; and
    means for returning said character wheel to an initial position when the calculator is lifted.
2. A calculator according to claim 1 further including indicating means for determining the printing position.

* * * * *